W. MACKINTOSH.
UNDERGROUND TELEGRAPH LINE.

No. 186,356. Patented Jan. 16, 1877.

2 Sheets—Sheet 2.
W. MACKINTOSH.
UNDERGROUND TELEGRAPH LINE.
No. 186,356. Patented Jan. 16, 1877.
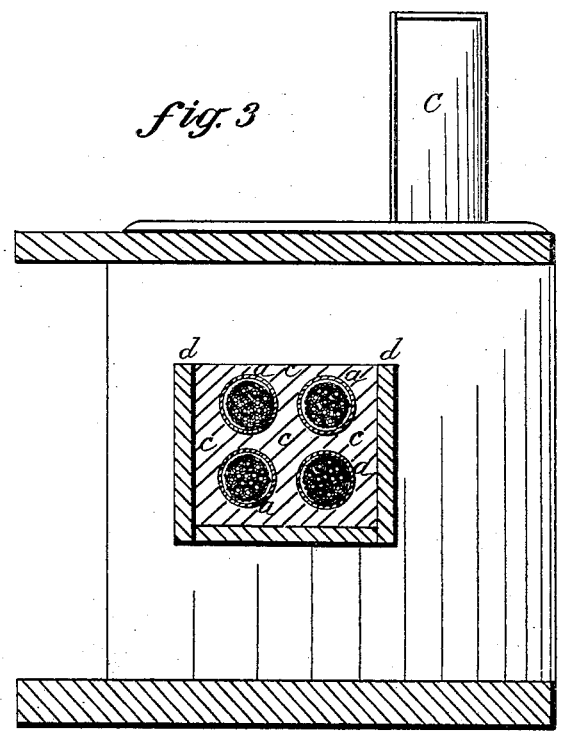
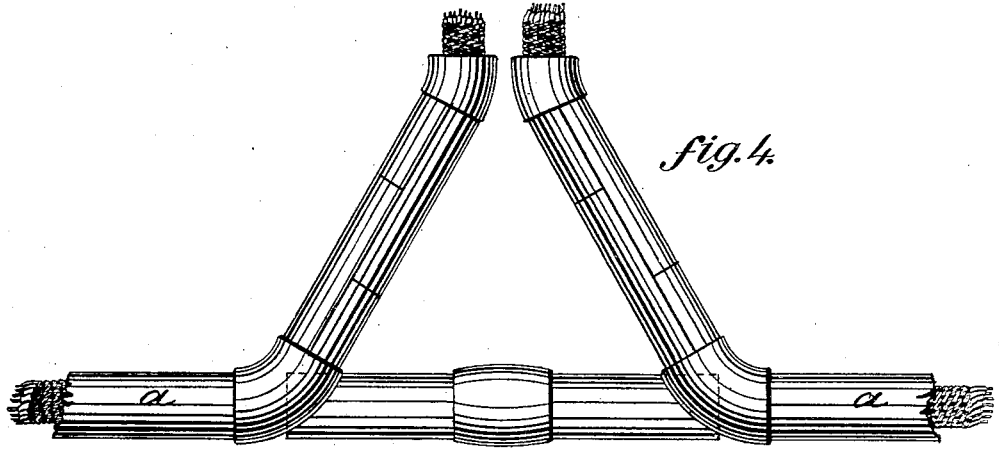
Witnesses:
H. Rutherford
W. B. Chaffee
Inventor:
William Mackintosh
By Johnson and Johnson
his Attorneys
Washington, D.C.

UNITED STATES PATENT OFFICE.

WILLIAM MACKINTOSH, OF NEW YORK, N. Y.

IMPROVEMENT IN UNDER-GROUND TELEGRAPH-LINES.

Specification forming part of Letters Patent No. 186,356, dated January 16, 1877; application filed February 17, 1874.

*To all whom it may concern:*

Be it known that I, WILLIAM MACKINTOSH, of the city, county, and State of New York, have invented certain new and useful Improvements in Under-Ground Cables for Telegraph-Lines, of which the following is a specification:

My invention appertains to under-ground conduits for telegraphic purposes.

Figure 1:
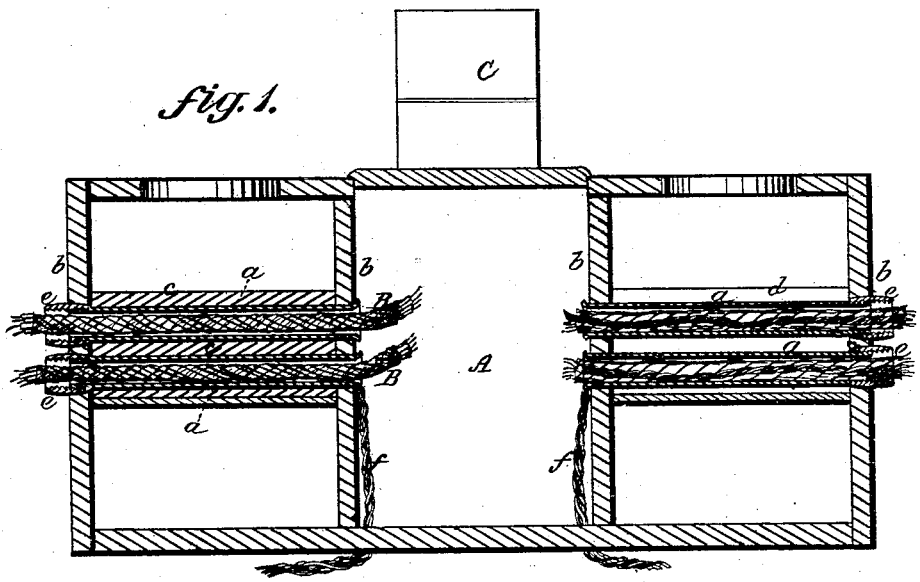
Figure 2:
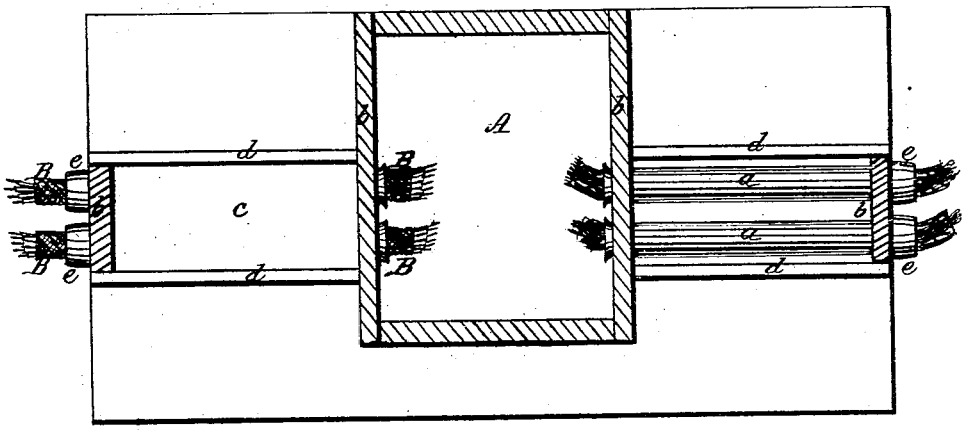

In the accompanying drawings, Figure 1 represents a vertical section of an under-ground telegraph-cable trunk embracing my invention; Fig. 2, a top view thereof, one section of the trunk showing the conduits uncovered, and the other with them embedded and covered; Fig. 3, a cross-section, and Fig. 4 a view showing the outside looping of the cables for opening offices.

In carrying out my invention I employ galvanized iron or earthen pipes $a$, from twelve to twenty-five feet long, and lay them parallel to each other, but not touching, their ends being supported in frames $b$, to maintain them in proper separate and parallel positions. They are then solidly embedded and covered by pouring hot asphaltum or Roman cement $c$ over, under, and between them, the supporting-frames also forming troughs $d$, to hold the material while being poured in to encompass the pipes. At suitable distances these embedded pipes terminate in vaults A, built beneath the ground. The sections of the pipes $a$ are connected together by right-and-left screw-couplings $e$ before they are fixed in their solid bed. The couplings $e$ for the separate lines of pipes must not touch each other.

Any suitable number of cable-conduits may be laid in this manner, and a cable of fifteen or twenty wires will go through an inch-and-a-half pipe, so that four inch-and-half pipes would carry eighty wires to each cable B. Box and all would not require more than six inches of space, and can be laid under any sidewalk, or in any street or highway, at very small expense, and which will last a great time.

The method by which the cables B are laid is by forcing a wire or wire-rope through the conduit by attaching it to a head or box fitting said conduit, and running it through by the force of vacuum from one vault, A, to another, and attaching said draft-line to the cable, it can be drawn through from vault to vault in a little while. In this way all the pipes laid can be filled with cables, or spare conduits left to be filled in the same manner at any time the business may require an increase of lines. My invention in this respect offers many advantages over air-lines, or insulated lines embedded in asphaltum.

Ground-wires $f$ are used in the vaults A, connected to the projecting ends of the pipes $a$, and run into the ground, to assist in carrying off any surplus electricity that may escape from the conductors.

The cables can be carried out of the vaults in any direction, as may be required, after connecting with the testing-switch. Cables can be tested above ground or in vaults, and renewed by drawing out defective cable and drawing in a perfect one.

The ends of the cables can be brought above ground in an iron testing-box, C, with a door. This test-box should be lined with hard or vulcanized rubber, glass, or porcelain, with binding-screws properly set in the rubber to connect with the cable-conductors.

For looping any one of the embedded cables, or the wires thereof, in opening new offices on the route of the main trunk, the street and the bed is opened, and the cable cut at one of the joining conduits, and its two ends drawn out of two of the adjacent sections, and then encompassed by curved split tubes fitting with lapped joints, and these are joined with the trunk-conduits, and afterward built up with and embedded in asphaltum or cement, and the looping made without interfering with the working of the other cables. To do this the trunk only has to be opened at three joints of the conduits, which are afterward closed by the bed, leaving the conduit of the two sections hollow by the withdrawal therefrom of the looping ends, as shown in Fig. 4.

The cable, when formed of the insulated wires, is covered with canvas or bagging material, and coated with tar.

I claim—

1. The combination, in an under-ground cable, of the separately-embedded conduits $a$, couplings $e$, cables B, troughs $d$, supported in frames b, with the vaults and ground-wires f, connected to the ends of the embedded pipes a, all arranged as shown, and for the purpose specified.

2. For the purpose of looping a continuous cable in branch offices, the embedded conduit a, severed at two points, and looping pipes, combined with the disjoined ends thereof, in the manner shown and described.

The above specification of my improvement in under-ground cables for telegraph-lines signed this 10th day of February, A. D. 1874.

WM. MACKINTOSH.

Witnesses:
A. E. H. JOHNSON,
J. W. HAMILTON JOHNSON.